(12) United States Patent
Cariker et al.

(10) Patent No.: US 9,230,607 B2
(45) Date of Patent: Jan. 5, 2016

(54) HARD DRIVE MOUNTING AND SHOCK SYSTEM

(71) Applicant: Western Digital Technologies, Inc., Irvine, CA (US)

(72) Inventors: Bruce A. Cariker, Diamond Bar, CA (US); Mee Ok Chung, La Habra, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 193 days.

(21) Appl. No.: 14/134,350

(22) Filed: Dec. 19, 2013

(65) Prior Publication Data

US 2015/0062800 A1 Mar. 5, 2015

Related U.S. Application Data

(60) Provisional application No. 61/872,508, filed on Aug. 30, 2013, provisional application No. 61/903,856, filed on Nov. 13, 2013.

(51) Int. Cl.
*G06F 1/16* (2006.01)
*H05K 5/00* (2006.01)
*H05K 7/00* (2006.01)
*G11B 33/02* (2006.01)

(52) U.S. Cl.
CPC ............ *G11B 33/022* (2013.01); *G11B 33/025* (2013.01)

(58) Field of Classification Search
CPC .... G11B 33/08; G11B 33/022; G11B 33/025; G06F 1/187

USPC .................. 361/679.33, 679.34, 679.36, 752; 360/97.19; 206/1.5; 312/223.2
See application file for complete search history.

(56) References Cited

U.S. PATENT DOCUMENTS

| 5,216,582 | A | 6/1993 | Russell et al. |
| 5,251,104 | A | 10/1993 | Wandt et al. |
| 5,332,306 | A | 7/1994 | Babb et al. |
| 5,654,875 | A | 8/1997 | Lawson |
| 6,275,352 | B1 | 8/2001 | Tadepalli et al. |
| 6,444,904 | B1 | 9/2002 | Holman, IV et al. |
| 6,775,132 | B2 * | 8/2004 | Chen ...................... G06F 1/184 312/223.1 |

(Continued)

OTHER PUBLICATIONS

Malloy, Robert A., "Plastic Part Design for Injection Molding", 6.3 Snap Joint Assemblies, Dept. of Plastics Engineering, Univ. of Masachusetts, (1994), 24 pages.

(Continued)

*Primary Examiner* — Bernard Rojas (57) ABSTRACT

A mounting system can be used in a storage device or other electrical device to mount a component, such as a drive, while also providing at least some shock absorption. The mounting system can include a deflection arm, a protrusion and a hole. The protrusion and hole can be configured to engage one another. One of either the hole or the protrusion can be on the deflection arm and the other can be on the component being mounted. The mounting system can also include a locking tab configured to move to a position behind the deflection arm. The locking tab can decrease the amount of deflection that can be experienced by the deflection arm to prevent the component from becoming prematurely dislodged from the mounting system.

19 Claims, 5 Drawing Sheets

(56) References Cited

U.S. PATENT DOCUMENTS

| | | | |
|---|---|---|---|
| 7,016,190 B1* | 3/2006 | Chang | G06F 1/184 235/381 |
| 7,701,705 B1 | 4/2010 | Szeremeta | |
| 7,911,776 B2* | 3/2011 | Ikeda | G11B 33/124 361/679.33 |
| 8,064,194 B2 | 11/2011 | Szeremeta | |
| 8,113,873 B1 | 2/2012 | Sarraf | |
| 8,133,426 B1 | 3/2012 | Yurchenco et al. | |
| 8,358,395 B1 | 1/2013 | Szeremeta | |
| 8,417,979 B2 | 4/2013 | Maroney | |
| 8,462,460 B1* | 6/2013 | Szeremeta | G11B 33/025 360/97.19 |
| 8,498,088 B1 | 7/2013 | Klein | |
| 8,547,658 B1* | 10/2013 | Szeremeta | G11B 25/043 360/97.19 |
| 2003/0174464 A1 | 9/2003 | Funawatari et al. | |
| 2004/0100762 A1 | 5/2004 | Yuan et al. | |
| 2006/0226036 A1 | 10/2006 | Dewhurst et al. | |

OTHER PUBLICATIONS

Solvay Specialty Polymers, Technical Bulletin, "Snap-Fit Latch Design", www.SolvaySpecialtyPolymers.com, (2012), 5 pages.

BASF Corp., Technical Expertise Series, "Snap-Fit Design Manual", www.plasticsportal.com/usa, (2007), 24 pages.

Engineering Polymers—"Thermoplastics—A Design Guide, Part and Mold Design", Bayer MaterialScience, (2000), 3 pages.

DSM Engineering Plastics—Technical Guide, "Snap Fit Design", http://www.dsm.com/en_US/downloads/dep/snapfit_design.pdf, (2005), 9 pages.

U.S. Appl. No. 14/081,877, filed Nov. 15, 2013, 26 pages.

Wally Szeremeta, et al., U.S. Appl. No. 14/077,042, filed Nov. 11, 2013, 24 pages.

International Search Report and Written Opinion dated Dec. 8, 2014 from related PCT Serial No. PCT/US2014/053606, 9 pages.

* cited by examiner

HARD DRIVE MOUNTING AND SHOCK SYSTEM

CROSS-REFERENCE TO RELATED APPLICATIONS

This application claims priority to U.S. Provisional Application No. 61/872,508, entitled "LATCH SYSTEM," filed on Aug. 30, 2013; and to U.S. Provisional Application No. 61/903,856, entitled "HARD DRIVE MOUNTING AND SHOCK SYSTEM," filed on Nov. 13, 2013, which are herein incorporated by reference in their entirety.

BACKGROUND

A hard disk drive (HDD) is a storage drive used for storing and retrieving digital information. A HDD generally has one or more rapidly rotating disks with a magnetic head arranged on a moving actuator arm to read and write data to the disk surface. A typical disk is spun at speeds varying anywhere from 4,200 rpm in energy-efficient portable devices, to 15,000 rpm for high performance servers. Other disks may spin at 1,200 rpm, 3,600 rpm, or in the range of 5,400 rpm to 7,200 rpm, though any range of speeds could be used.

Due to the extremely close spacing between the magnetic head and the spinning disk surface, HDDs are vulnerable to being damaged by a head crash—a failure of the disk in which the head scrapes across the platter surface, often grinding away the thin magnetic film and causing data loss. Head crashes can be caused by, among other things, electronic failure, a sudden power failure, physical shock, contamination of the drive's internal enclosure, wear and tear, corrosion, or poorly manufactured disks and heads.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION

One way to protect a hard disk drive (HDD) from a head crash is to provide protection from physical shock. For example, the hard drive may be isolated from an enclosure and/or other components by shock mounts that are positioned between the hard drive and the enclosure. Various types of shock absorbing materials and systems can be used to decrease the impact of a physical shock on the storage drive. This can protect against a head crash, as well as other types of damage.

A hard drive mounting and shock absorbing system 10 will now be described with reference to a storage drive 100 with a hard disk drive (HDD) 20. It will be understood that the concepts described herein can be employed for other uses and with other devices, including, but not limited to, other types of storage drives, whether internal or external, computers, and all types of sensitive electronic devices. For example, the shock absorbing system may also be used with solid-state drives (SSD) and solid-state hybrid drives (SSHD).

Figure 1:
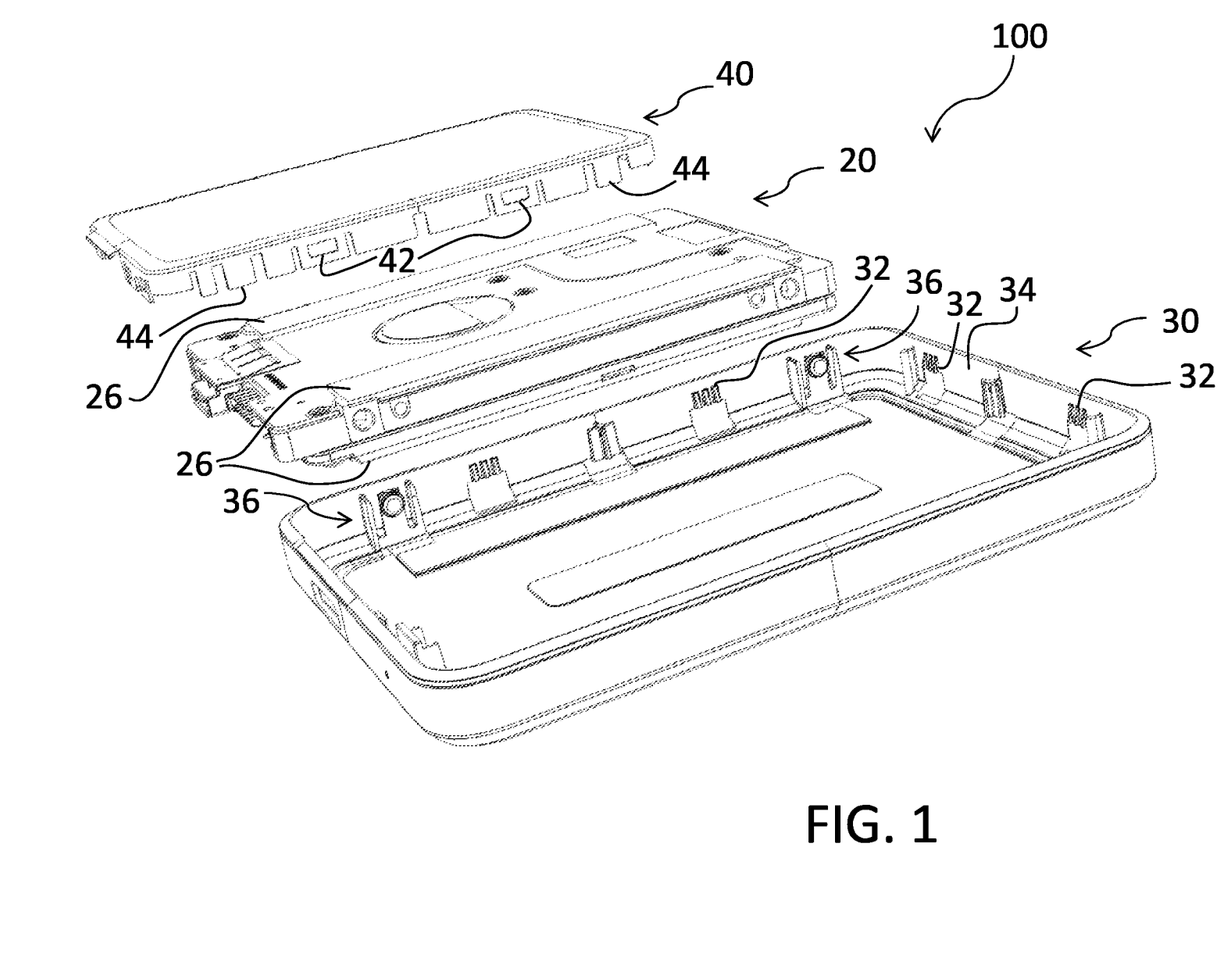
FIG. 1 is a partially exploded view of a storage drive.
Figure 2:
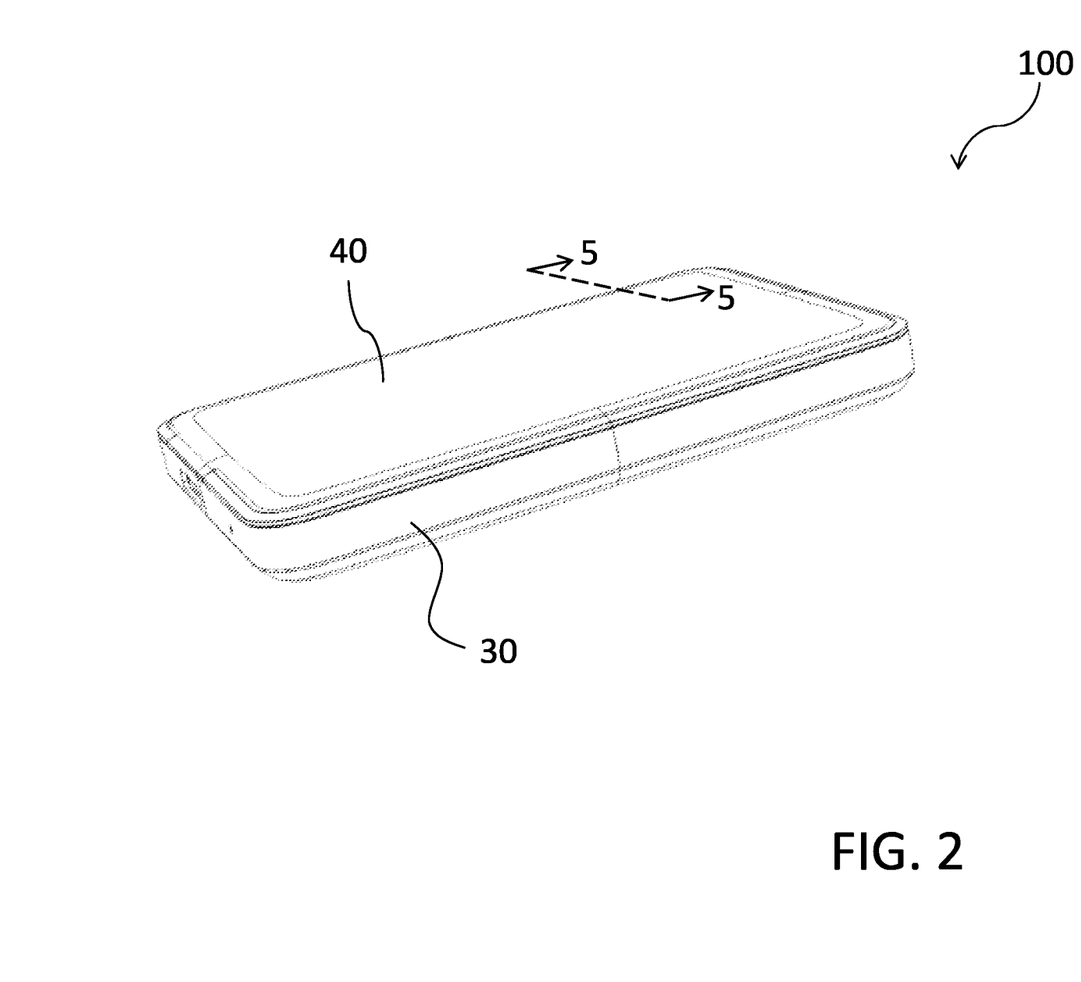
FIG. 2 shows the storage drive of FIG. 1 in an assembled condition.
Figure 3:
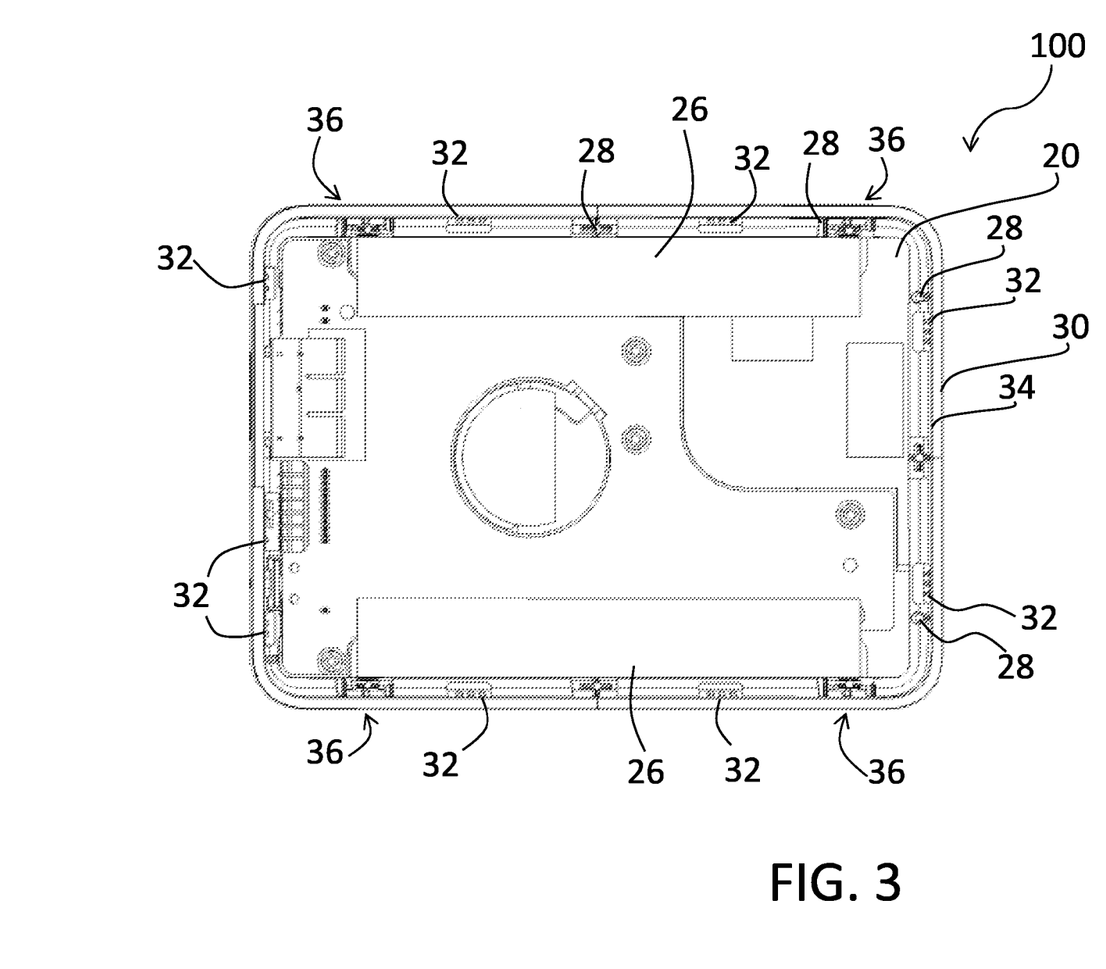
FIG. 3 shows a top view of the storage drive in a partially assembled condition.

Turning now to FIGS. 1-3, some of the features of the illustrated storage drive 100 will be described. The storage drive 100 is shown with first 30 and second 40 mating members that combine to form an enclosure. FIGS. 1 and 2 show the storage drive 100 in an unassembled and assembled condition, respectively. The storage drive 100 can include one or more fasteners, such as the illustrated snapfit projections 32 and windows 42, to secure the first 30 and second 40 mating members. A hard disk drive (HDD) 20 can be positioned within the enclosure as best seen in FIG. 3.

A hard disk drive 20 can be positioned within the enclosure. For example, the hard drive 20 can be mounted within a frame 34. The frame 34 can be used to position the hard disk drive 20 within the enclosure. In the illustrated embodiment, the frame 34 is a separate piece that is connected to the first mating member 30. The frame 34 may be part of, or may be an enclosure. For example, a plastic or metal frame can be positioned within a plastic or metal enclosure. In some embodiments, one of the mating members 30, 40 and frame 34 can be a single part. Other materials besides, or in addition to, plastic and metal can also be used. It will be understood that the enclosure is not limited to the configuration, shape, or size shown and may include other components, instead of or in addition to the drive 20.

Typically in other systems, the frame is separate from the mounting hardware and the shock mount system. In the illustrated storage drive 100, snap features 36 on the frame 34 can be used to mount the hard drive 20. The snap features 36 can best be seen in the detail views of FIGS. 4 and 5 and can be seen engaging the hard drive 20 in FIGS. 3 and 5. The snap features 36 can provide the mounting hardware, the shock mount system and/or be part of the frame. This can help to reduce assembly time as the hard drive 20 can be snapped into place without requiring additional labor.

A mounting system can be used for mounting a disk drive or other sensitive electronic component within a housing or frame. The mounting system can include a snap feature 36 having a deflection arm which includes one or more of a protrusion extending therefrom and a hole. The drive or other component can have a hole or protrusion that can engage with the respective protrusion or hole on the deflection arm. The mounting system may also include a locking tab 44 as will be described in more detail below.

The snap features 36 can be similar to a deflection latch. Deflection latch systems are commonly used to hold two parts together. They are common in the electronics industry and are often used in place of fasteners such as screws. Use of deflection latch systems can speed the assembly process, decrease production cost and reduce the number of parts. A deflection latch system may also be known as a snap latch, hook type deflection latch, or snap fit, among other names. As previously discussed, the storage drive 100 may include one or more fasteners, such as the illustrated snapfit projections 32 and windows 42, to secure the first 30 and second 40 mating members. These snapfit projections 32 and windows 42 are an example of a deflection latch system. Deflection latch systems are discussed in further detail in U.S. Provisional Application No. 61/872,508, entitled "LATCH SYSTEM," filed on Aug. 30, 2013 incorporated by reference herein.

Typically, deflection latch systems connect two components with mating parts. For example, in the illustrated example, the top 40 and bottom 30 of the enclosure can connect with a deflection latch system. In a deflection latch system, the two parts move toward each other until the first part, such as a deflecting arm, of the latch system deflects over the mating part, such as a hook shape feature 32. If the system is kept in tension the latch system will resist the separation of the two parts until the deflection strength of the arm is overcome by a force. Another way to describe a deflection latch system is a mechanical joint system where part-to-part attachment is accomplished with locating and locking features (constraint features) that are homogenous with one or the other of the components being joined. Joining requires the (flexible) locking features to move aside for engagement with the mating part, followed by return of the locking feature toward its original position to accomplish the interference required to latch the components together. The mating part may be a locator feature, and may provide strength and stability in the attachment by being less flexible than the locking feature. Though, this is not always the case as two flexible locking features may also engage one another.

Figure 4:
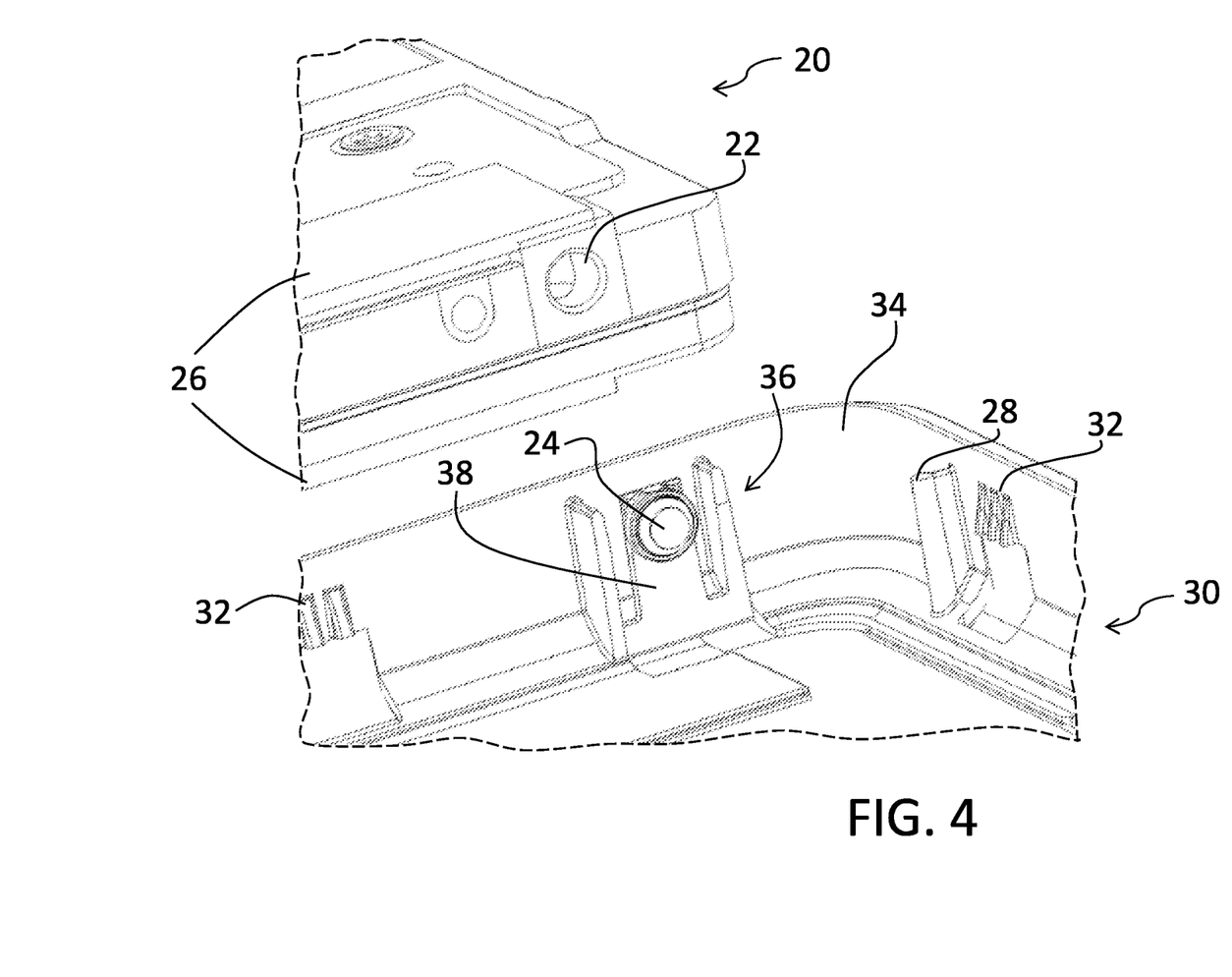
FIG. 4 illustrates a detail view of a portion of the storage drive of FIG. 1.

Looking now to the snap features 36 as shown in FIG. 4, the snap feature 36 can include a deflection arm 38. The deflection arm 38 can move in and out to allow the hard drive 20 to snap into place. The deflection arm 38 can be part of the frame. The deflection arm 38 is shown extending upwards in a vertical orientation from the bottom 30 of the enclosure. The deflection arm can have one of many different orientations and shapes dependent on many different factors such as the desired mounting position of the hard drive, the space available within the enclosure, etc.

The snap feature can also include a hole 22 and/or a protrusion 24. For example, a deflection arm 38 on the frame 34 can have a protrusion 24 extending therefrom configured to engage a hole 22 on the drive 20 to thereby mount the drive 20 within the storage device 100. In some embodiments, a protrusion 24 on the hard drive 20 can engage a hole 22 on the deflection arm 38 as part of the snap feature 36.

The protrusion 24 and hole 22 can have any number of different shapes. In a preferred embodiment, the shapes are corresponding, such as corresponding round shapes, but they can also be different such as a square protrusion and a circular hole or a pyramid protrusion and a square hole. As shown, the protrusion is spherical and it engages a round hole. The spherical or bulbous shape (see FIG. 5) can be self-centering, and/or can otherwise allow for simple, reliable and repeatable connection of the hole and the projection and therefore of the drive and the deflection arm or frame. Other shapes can also be used.

As best seen in FIG. 3, four snap features 36 can be used to mount the hard drive 20 within the frame 34. In some embodiments, the hard drive 20 can be only partially supported by the snap features 36. For example, there may only be one or two snap features 36. In other embodiments, the hard drive can be supported by three, four or more snap features. The hard drive may be fully supported by the snap features 36, though at the same time, other features may also be used for shock absorption, and to center the hard drive 20. For example, foam 26 or other shock absorptive materials can be used to further increase shock absorption. Tabs 28 on the frame can also be used to help center the hard drive 20.

In some embodiments, a storage device can include at least 3 mounting systems per drive. In some embodiments, a storage device can have two pairs of mounting systems, wherein each pair of mounting systems is positioned to be on opposite sides of the drive.

The snap feature 36 used for mounting the hard drive 20 is not shown with a locking component. Rather, the hard drive 20 is held in place by having snap features 36 on either side of the hard drive 20 that sandwich the hard drive 20 and hold it in place (see FIG. 3). At the same time, some embodiments may include a locking feature.

Figure 5:
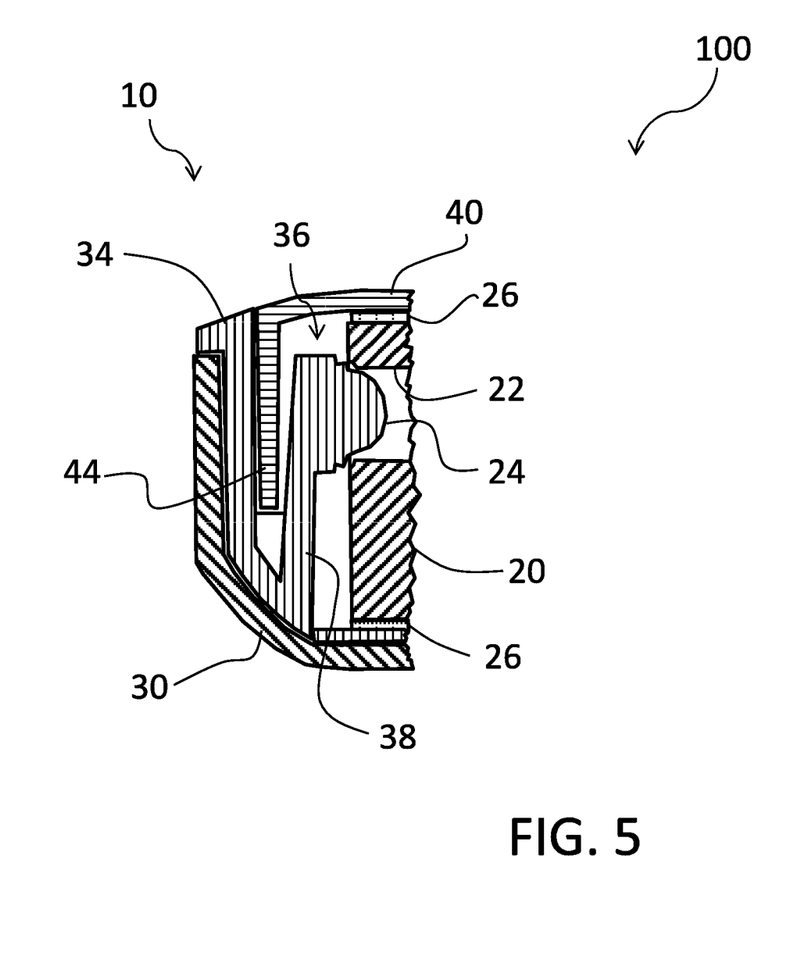
FIG. 5 is a cross-section of an assembled storage drive taken along line 5-5 of FIG. 2.

In some embodiments and as shown in FIG. 5, the snap feature 36 may be locked into place by a locking tab 44 on the top 40 of the enclosure, or another assembly piece added after the hard drive 20 is connected to the snap feature 36. In the illustrated embodiment, the locking tab 44 extends downward from a surface of the top 40 of the storage device 100.

A locking tab 44 can be configured for movement to a position behind the deflection arm 38, such that when the drive 20 is mounted within the storage device 100 the deflection arm 38 is positioned between the locking tab 44 and the drive 20 to decrease the amount of deflection that can be experienced by the deflection arm 38. This can prevent the drive 20 from becoming prematurely dislodged from the mounting system. This can lock the shock mount in place.

The thickness of the locking tab 44 should be such that the part can fit between the snap feature 36 and an adjacent wall or other structure. FIG. 5 illustrates the locking tab 44 positioned between the snap feature 36 and a wall formed by the frame 34. The snap feature 36 is shown sandwiched between the hard drive 20 and the locking tab 44. In this way the snap feature 36 can be prevented from being able to fully deflect such that the hard drive 20 could be released from being held in place.

Though the locking tab 44 is illustrated as being part of the top 40 of the enclosure, the locking tab 44 could be located on a different piece as well, as long as the locking tab can be moved into position behind the snap feature 36 after the hard drive 20 has been connected to the snap feature 36. Though the illustrated embodiment has a locking tab 44 that corresponds with each snap feature 36, it will be understood that certain embodiments can include fewer locking tabs 44 than snap features 36.

Looking back to FIG. 1, the locking tab 44 is shown being fairly short in length as compared to the length of the entire side of the top 40 of the enclosure. In some embodiments the locking tab 44 can extend the entire length of the top 40 of the enclosure or other part to which it is attached. In some embodiments the locking tab 44 can be about, smaller than, the same size as, or larger than the dimension of the adjacent part of the snap feature 36.

The assembled enclosure can secure the hard drive within the enclosure, as well as provide mounting and shock absorption. It will be understood that some embodiments may provide additional benefits, or only some of the benefits, or even additional benefits not described herein.

In addition to the mounting system, other components can also be used in conjunction to provide additional shock absorption and/or to properly isolate the hard drive 20 from the frame 34 and/or enclosure. For example, foam 26 can be placed on one or more surfaces of the hard drive 20, frame 34 and/or enclosure. In FIG. 5, foam 26 can be seen positioned on the top and bottom of the hard drive 20 between the hard drive and the top 40 and bottom 30 of the enclosure. The frame 34 and/or enclosure can also include one or more tabs or protrusions 28 which can serve to center the hard drive 20 in the enclosure and also limit contact of the hard drive 20 with the walls of the frame 34 and/or enclosure; this is best seen in FIG. 3.

A mounting system can be used in a storage device or other electrical device to mount a component, such as a drive, while also providing at least some shock absorption. The mounting system can include a deflection arm, a protrusion and a hole. The protrusion and hole can be configured to engage one another. One of either the hole or the protrusion can be on the deflection arm and the other can be on the component being mounted. The mounting system can also include a locking tab configured to move to a position behind the deflection arm. The locking tab can decrease the amount of deflection that can be experienced by the deflection arm to prevent the component from becoming prematurely dislodged from the mounting system.

In some embodiments, an enclosure for a disk drive can include a frame comprising a plurality of snap features for mounting the disk drive, wherein each snap feature includes a shock mount that snap fits into a mounting hole in the disk drive, wherein the enclosure further includes a top cover comprising a plurality of tabs, and wherein each tab fits behind one of the snap features so as to lock the shock mount in place.

A storage device can comprise a frame, a drive and a mounting system for mounting the drive within the storage device. The mounting system can include a hole, a protrusion configured to engage the hole, a deflection arm and a locking tab. The deflection arm can be on the frame and one of either the hole or the protrusion can be on the deflection arm. The other of the two can be on the drive, which would include the possibility of a frame surrounding the drive. The drive can be mounted within the storage device when the protrusion is engaged with the hole. The locking tab can be configured for movement to a position behind the deflection arm after the drive is mounted within the storage device. In this way, the deflection arm can be positioned between the locking tab and the drive to decrease the amount of deflection that can be experienced by the deflection arm and to prevent the drive from becoming prematurely dislodged from the mounting system.

The locking tab can be on a part of an enclosure, such as the lid or top, but can also be a separate piece, or even part of the drive that can be moved into place after the drive has been connected to the deflection arm. The locking tab may extend downward from a surface of the top of the storage device.

A storage device can include first and second mating members that when engaged are configured to form an enclosure, a frame, and a mounting system configured for mounting a drive within the storage device. The mounting system may comprise a deflection arm on the frame, the deflection arm having a protrusion extending therefrom configured to engage a hole on the drive to thereby mount the drive within the storage device, the frame being part of the first mating member; and a locking tab extending downwardly from a surface of the second mating member, the locking tab configured to be positioned behind the deflection arm after the first and second mating members are engaged, such that when the drive is mounted within the storage device the deflection arm is positioned between the locking tab and the drive to decrease the amount of deflection that can be experienced by the deflection arm and to prevent the drive from becoming prematurely dislodged from the mounting system.

A storage device can comprise a frame and a mounting system configured for mounting a drive within the storage device. The mounting system can comprise a deflection arm on the frame, the deflection arm having a protrusion extending therefrom configured to engage a hole on the drive to thereby mount the drive within the storage device; and a locking tab configured for movement to a position behind the deflection arm, such that when the drive is mounted within the storage device the deflection arm is positioned between the locking tab and the drive to decrease the amount of deflection that can be experienced by the deflection arm and to prevent the drive from becoming prematurely dislodged from the mounting system.

A mounting system can be used for mounting a disk drive or other sensitive electronic component within a housing. The mounting system can comprise a deflection arm configured to engage a drive to thereby mount the drive in a desired position. In some embodiments, the deflection arm can have a protrusion extending therefrom configured to engage a hole on the drive. In other embodiments the deflection arm can include a hole configured to engage a protrusion on the drive. The mounting system may also include a locking tab configured for movement to a position behind the deflection arm. The locking tab can decrease the amount of deflection that can be experienced by the deflection arm to prevent the drive from becoming prematurely dislodged from the mounting system In some embodiments, an enclosure for a disk drive can include a frame comprising a plurality of snap features for mounting the disk drive, wherein each snap feature includes a shock mount that snap fits into a mounting hole in the disk drive, wherein the enclosure further includes a top cover comprising a plurality of tabs, and wherein each tab fits behind one of the snap features so as to lock the shock mount in place.

Among other benefits, the systems described herein can eliminate mounting hardware, and reduce the necessity for additional shock mounting parts. Part count and assembly time can also both be reduced.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A storage device comprising a frame, a drive and a mounting system for mounting the drive within the storage device, the mounting system comprising:
   a hole;
   a protrusion configured to engage the hole;
   a deflection arm on the frame, one of either the hole or the protrusion being on the deflection arm and the other being on the drive, the drive being mounted within the storage device when the protrusion is engaged with the hole; and
   a locking tab configured for movement to a position behind the deflection arm after the drive is mounted within the storage device such that the deflection arm is positioned between the locking tab and the drive to decrease the amount of deflection that can be experienced by the deflection arm and to prevent the drive from becoming prematurely dislodged from the mounting system.

2. The storage device of claim 1, further comprising first and second mating members that when engaged are configured to form an enclosure.

3. The storage device of claim 2, wherein the frame is part of the first mating member.

4. The storage device of claim 3, wherein the locking tab is part of the second mating member.

5. The storage device of claim 4, wherein the second mating member is a top of the storage device.

6. The storage device of claim 5, wherein the locking tab extends downward from a surface of the top of the storage device.

7. The storage device of claim 1, wherein the frame and the deflection arm are a single piece.

8. The storage device of claim 1, comprising at least 3 mounting systems per drive.

9. The storage device of claim 1, comprising two pairs of mounting systems, wherein each pair of mounting systems is positioned to be on opposite sides of the drive.

10. A storage device comprising first and second mating members that when engaged are configured to form an enclosure, a frame, and a mounting system configured for mounting a drive within the storage device, the mounting system comprising:
    a deflection arm on the frame, the deflection arm having a protrusion extending therefrom configured to engage a hole on the drive to thereby mount the drive within the storage device, the frame being part of the first mating member; and
    a locking tab extending downwardly from a surface of the second mating member, the locking tab configured to be positioned behind the deflection arm after the first and second mating members are engaged, such that when the drive is mounted within the storage device the deflection arm is positioned between the locking tab and the drive to decrease the amount of deflection that can be experienced by the deflection arm and to prevent the drive from becoming prematurely dislodged from the mounting system.

11. The storage device of claim 10, further comprising the drive.

12. The storage device of claim 10, wherein the second mating member is a top of the storage device.

13. The storage device of claim 10, wherein the first mating member, frame and deflection arm are a single piece.

14. The storage device of claim 13, further comprising an outer member, wherein the first mating member is positioned within and connected to the outer member, the outer member forming a portion of an outer surface of the enclosure.

15. The storage device of claim 10, comprising at least 3 mounting systems.

16. The storage device of claim 10, comprising two pairs of mounting systems, wherein each pair of mounting systems is positioned on opposite sides of the frame.

17. A storage device comprising a frame and a mounting system configured for mounting a drive within the storage device, the mounting system comprising:
    a deflection arm on the frame, the deflection arm having a protrusion extending therefrom configured to engage a hole on the drive to thereby mount the drive within the storage device; and
    a locking tab configured for movement to a position behind the deflection arm, such that when the drive is mounted within the storage device the deflection arm is positioned between the locking tab and the drive to decrease the amount of deflection that can be experienced by the deflection arm and to prevent the drive from becoming prematurely dislodged from the mounting system.

18. The storage device of claim 17, further comprising the drive.

19. The storage device of claim 17, wherein the locking tab extends downward from a surface of a top of the storage device that connects with the frame to form an enclosure.

* * * * *